(12) United States Patent
Chen et al.

(10) Patent No.: US 12,704,603 B2
(45) Date of Patent: Aug. 11, 2026

(54) LIGHT EMITTING ASSEMBLY, TIME OF FLIGHT CAMERA MODULE, AND MOBILE TERMINAL

(71) Applicant: HUAWEI TECHNOLOGIES CO., LTD., Shenzhen (CN)

(72) Inventors: Hongmin Chen, Shenzhen (CN); Xiuwen Ma, Wuhan (CN); Chong Zhao, Wuhan (CN); Kaisheng Chen, Wuhan (CN); Zhiwei Wu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 972 days.

(21) Appl. No.: 17/966,114

(22) Filed: Oct. 14, 2022

(65) Prior Publication Data

US 2023/0030614 A1 Feb. 2, 2023

Related U.S. Application Data

(63) Continuation of application No. PCT/CN2020/085202, filed on Apr. 16, 2020.

(51) Int. Cl.

| | |
|---|---|
| ***G01S 7/48*** | (2006.01) |
| ***G01S 7/481*** | (2006.01) |
| ***G01S 17/894*** | (2020.01) |
| ***G02B 3/00*** | (2006.01) |
| *G02B 13/00* | (2006.01) |

(52) U.S. Cl.
CPC .......... *G01S 7/4815* (2013.01); *G01S 17/894* (2020.01); *G02B 3/005* (2013.01); *G02B 13/0015* (2013.01)

(58) Field of Classification Search
CPC .... G01S 7/4815; G01S 17/894; G01S 7/4817; G02B 3/005; G02B 13/0015; G02B 26/10; G02B 27/0922; G02B 27/0961
See application file for complete search history.

(56) References Cited

U.S. PATENT DOCUMENTS

2019/0137611 A1* 5/2019 Gudeman ............ G01S 7/4815

FOREIGN PATENT DOCUMENTS

| | | |
|---|---|---|
| CN | 204229115 U | 3/2015 |
| CN | 106489265 A | 3/2017 |

(Continued)

OTHER PUBLICATIONS

Extended European Search Report for Application No. 20931621 dated Apr. 5, 2023, 9 pages.

(Continued)

*Primary Examiner* — Tony Ko

(57) ABSTRACT

An example light emitting assembly includes a substrate, a laser light source array, and a lens array. The laser light source array is disposed on the substrate, the lens array is disposed on a light emitting side of the laser light source array, one lens in the lens array is disposed opposite to at least one laser light source in the laser light source array, a light emitting surface of the lens is a spherical surface, and at least some laser light sources are eccentrically arranged with corresponding lenses. In an example manufacturing process, lenses of a same structure and laser light sources of a same structure are used, and eccentric distances between the laser light sources and the lenses are changed, so that light emitting assemblies with different divergence angles can be prepared.

16 Claims, 14 Drawing Sheets

(56) References Cited

FOREIGN PATENT DOCUMENTS

| | | | |
|---|---|---|---|
| CN | 109103748 | A | 12/2018 |
| CN | 208795950 | U | 4/2019 |
| CN | 110609293 | A | 12/2019 |
| CN | 110824490 | A | 2/2020 |
| WO | 2019197717 | A1 | 10/2019 |

OTHER PUBLICATIONS

PCT International Search Report for Application No. PCT/CN2020/085202 dated Apr. 16, 2020, 10 pages.
Chinese Office Action for Application No. 202080099767.8 dated Nov. 22, 2023, 8 pages.

* cited by examiner

LIGHT EMITTING ASSEMBLY, TIME OF FLIGHT CAMERA MODULE, AND MOBILE TERMINAL

CROSS-REFERENCE TO RELATED DISCLOSURES

This application is a continuation of International Application No. PCT/CN2020/085202, filed on Apr. 16, 2020, the disclosure of which is hereby incorporated by reference in its entirety.

TECHNICAL FIELD

This application relates to the field of electronic product technologies, and in particular, to a light emitting assembly, a time of flight camera module, and a mobile terminal.

BACKGROUND

A 3D depth sensing technology is an inevitable development trend of emerging fields of consumer electronics, automotive electronics, laser radars, biological perception, artificial intelligence, and the like in the future. A main implementation solution of 3D depth sensing is that a time of flight-based ranging technology, namely, a time of flight (TOF) camera module, is introduced into conventional 2D shooting to obtain depth information of an image, thereby implementing 3D depth measurement. Specifically, a light source using pulse pumping is used to generate a short pulsed beam, the short pulsed beam is projected onto a target object, the beam is reflected by the target object and is then received by a photosensitive assembly, and a distance to the object, namely, depth information, is calculated by calculating a time difference or a phase difference between a time point at which an optical pulse is emitted and a time point at which the optical pulse is received.

A divergence angle of a laser light source is fixed. In an actual application, the divergence angle sometimes needs to be increased and sometimes needs to be decreased. For example, in a TOF camera module, to obtain a maximum illumination field range and a detection effect, a beam emitted from the TOF camera module needs to have specific intensity distribution and a specific field of view (FOV). For example, the FOV may be as large as 50° while intensities are evenly distributed. However, the divergence angle of the laser light source usually ranges from 10° to 30°. Consequently, the laser light source cannot meet an application requirement of the TOF camera module.

In the conventional technology, with reference to FIG. 1, light emitted from a laser light source 01 is modulated by a light diffuser 02. A surface of the light diffuser 02 has an irregular concave-convex structure, and the light is diffused through diffuse reflection of light by the concave-convex structure, so that a larger divergence angle is obtained after a beam emitted from the laser light source 01 passes through the light diffuser 02 (as shown in FIG. 1, a divergence angle of the laser light source is increased from $\alpha$ to $\beta$).

In a process of assembling a time of flight camera module, the light diffuser 02 of a same structure has a fixed and unique light diffusion angle. Therefore, to implement a different divergence angle, a light diffuser of a different structure needs to be mounted. Consequently, manufacturing costs are correspondingly increased.

Currently, a technical solution in which a time of flight camera module with different divergence angles can be manufactured by changing a location relationship between parts without changing structures of the parts is required, to reduce manufacturing costs.

SUMMARY

Embodiments of this application provide a light emitting assembly, a time of flight camera module, and a mobile terminal, and are mainly intended to provide a light emitting assembly in which a lens array is disposed on a light emitting side of a laser light source array, to change, through an eccentric arrangement between a laser light source and a lens, a divergence angle of light emitted from the lens.

To achieve the foregoing objectives, the following technical solutions are used in embodiments of this application.

According to a first aspect, this application provides a light emitting assembly, configured to be disposed in a time of flight camera module. The light emitting assembly includes a substrate, a laser light source array, and a lens array, where the laser light source array is disposed on the substrate, the lens array is disposed on a light emitting side of the laser light source array, one lens in the lens array is disposed opposite to at least one laser light source in the laser light source array, a light emitting surface of the lens is a spherical surface, and at least some laser light sources are eccentrically arranged with corresponding lenses.

In the light emitting assembly provided in this embodiment of this application, the lens array is disposed on the light emitting side of the laser light source array, and the light emitting surface of the lens in the lens array is a spherical surface. When light of the laser light source in the laser light source array is transmitted to the light emitting surface of the lens, the spherical light emitting surface refracts the light to change a divergence angle. In addition, the at least some laser light sources are eccentrically arranged with the lenses, to change divergence angle distribution of the laser light source array.

When the light emitting assembly is assembled, an eccentric distance between the laser light source and the lens is changed, so that the obtained light emitting assembly has different divergence angles. That is, when the light emitting assembly is assembled by using a lens of a same structure and a laser light source of a same structure, a plurality of light emitting assemblies with different divergence angles may be formed by changing an eccentric distance between the laser light source and the lens. When the eccentric distance is different, a shape of an arc surface that is of the lens and that is opposite to the laser light source is different, and an angle of inclination of a normal line of the arc surface is also different. In this way, the divergence angle of the light refracted by the light emitting surface of the lens is also different. Therefore, to implement different divergence angles, the eccentric distance between the laser light source and the lens may be changed, so that in the time of flight camera module, the divergence angle distribution of the laser light source array is changed through an eccentric arrangement between the laser light source array and the lens array. Compared with the conventional technology in which a divergence angle is changed by changing a light diffuser, an implementation is more convenient, and manufacturing costs are reduced.

In a possible implementation of the first aspect, the laser light source array forms N light emitting regions, there are at least two laser light sources in each light emitting region, N is an integer greater than 1, and eccentric distances of some laser light sources in every two light emitting regions are equal or eccentric distances of all laser light sources in every two light emitting regions are unequal.

Because the eccentric distances of some laser light sources in every two light emitting regions are equal or the eccentric distances of all laser light sources in every two light emitting regions are unequal, far-field spots formed after light emitted from any two light emitting regions passes through corresponding lens arrays are different. In a specific implementation, the laser light source array is divided into N light emitting regions based on a target far-field spot, so that a spot of each region is a target far-field sub-spot. In addition, the N light emitting regions of the laser light source array are in a one-to-one correspondence with the N regions of the target far-field spot, and a far-field spot formed by each light emitting region is consistent with a corresponding target far-field sub-spot. In this way, ranging can be implemented.

In a possible implementation of the first aspect, each light emitting region has a power supply unit, the power supply unit is configured to turn on and turn off all laser light sources in a corresponding light emitting region, and a plurality of power supply units are connected in parallel. Each light emitting region of the laser light source array has the power supply unit, and the plurality of power supply units are connected in parallel. In this way, when long-distance ranging is performed, only one light emitting region can be turned on each time. If an input power for all laser light sources is 20 W, and there are 100 laser light sources, when an existing solution in which all the laser light sources are turned on at one time is used, an input current of each laser light source is 0.1 A. If the solution provided in this embodiment of this application is used, the laser light sources are divided into 10 light emitting regions, and each light emitting region has 10 laser light sources. Each time turn-on is performed, an input current of each laser light source is 1 A. Compared with the input current of 0.1 A, the input current of 1 A is significantly increased. In this way, luminance of the laser light sources is obviously improved to implement long-distance ranging.

In a possible implementation of the first aspect, the laser light source array includes a first laser light source and a second laser light source that are adjacent to each other, the lens array includes a first lens, the first lens is disposed on a light emitting side of the first laser light source and a light emitting side of the second laser light source, an eccentric distance between the first laser light source and the first lens is a first eccentric distance, an eccentric distance between the second laser light source and the first lens is a second eccentric distance, and the first eccentric distance and the second eccentric distance are unequal. That is, when the first eccentric distance between the first laser light source and the first lens and the second eccentric distance between the second laser light source and the first lens are unequal, the first laser light source and the second laser light source may share one lens. In this way, a quantity of lenses is reduced, thereby simplifying a structure of the entire light emitting assembly. In a possible implementation of the first aspect, the substrate is made of a transparent conductive material, and the substrate has a first surface and a second surface that are opposite to each other; the laser light source includes an N-type confining layer, an active layer, a P-type confining layer, an anode electrode layer, and a cathode electrode layer, the N-type confining layer, the active layer, the P-type confining layer, and the anode electrode layer are stacked on the first surface from bottom to top, and the cathode electrode layer is also disposed on the first surface; and the lens array is disposed on one side of the second surface, and the light emitting surface of the lens is opposite to the second surface. Because the anode electrode layer, the N-type confining layer, the active layer, and the P-type confining layer that are stacked are located on the first surface, and the cathode electrode layer is also located on the first surface, the two electrode layers of the laser light source are coplanar. In this way, in a specific implementation, both the cathode electrode layer and the anode electrode layer that are located on one side of the first surface can be electrically connected to a corresponding cathode pin and a corresponding anode pin of a drive circuit by using welding structures. Compared with the conventional technology in which two electrode layers are not coplanar, there is no need to electrically connect the anode electrode layer to the drive circuit through a connecting wire. In this way, a structure is simplified, and correspondingly, a processing step is simplified.

In a possible implementation of the first aspect, the light emitting assembly further includes: a circuit board, where a drive circuit is disposed on the circuit board, the cathode electrode layer is electrically connected to a cathode pin of the drive circuit by using a first welding structure, and the anode electrode layer is electrically connected to an anode pin of the drive circuit by using a second welding structure. The first surface of the substrate faces the circuit board, and both the cathode electrode layer and the anode electrode layer are located on the first surface. In this way, the cathode electrode layer and the anode electrode layer can be electrically connected to the corresponding cathode pin and the corresponding anode pin of the drive circuit by using the welding structures. Compared with a manner in which a connecting wire is used for connection, an operation process is simplified, and a size of the entire light emitting assembly in a height direction is correspondingly reduced, so that the entire light emitting assembly meets a miniaturization design requirement.

In a possible implementation of the first aspect, the lens is integrally formed with the substrate; or the lens is connected to the substrate by using a metal bonding structure. Compared with an existing bonding manner, in the integration manner or the manner of using the metal bonding structure for connection, on a basis of changing the divergence angle of the light emitted from the laser light source, the lens is not easy to fall off. In this way, there is no need to dispose a detector configured to monitor whether the lens falls off. Therefore, the structure of the entire light emitting assembly is simplified, and the size of the entire light emitting assembly is correspondingly reduced, to meet the miniaturization design requirement.

In a possible implementation of the first aspect, the substrate is made of a conductive material, and the substrate has a first surface and a second surface that are opposite to each other; the laser light source includes an N-type confining layer, an active layer, a P-type confining layer, an anode electrode layer, and a cathode electrode layer, the N-type confining layer, the active layer, the P-type confining layer, and the anode electrode layer are stacked on the first surface from bottom to top, and the cathode electrode layer is disposed on the second surface; and the lens array is disposed on one side of the first surface, and the light emitting surface of the lens is opposite to the first surface.

In a possible implementation of the first aspect, the light emitting assembly further includes: a circuit board, where a drive circuit is disposed on the circuit board, the cathode electrode layer is electrically connected to a cathode pin of the drive circuit by using a welding structure, and the anode electrode layer is electrically connected to an anode pin of the drive circuit through a connecting wire.

In a possible implementation of the first aspect, the first surface on which the N-type confining layer, the active layer, the P-type confining layer, and the anode electrode layer are formed is covered with a transparent cover layer, and the lens is formed on a surface that is of the transparent cover layer and that is opposite to the first surface. The transparent cover layer is covered on the first surface that has the laser light source, so that the lens is formed on one side that is of the transparent cover layer and that is away from the first surface, thereby effectively ensuring connection strength of the lens.

In a possible implementation of the first aspect, the lens is a convex lens or a concave lens.

In a possible implementation of the first aspect, lenses in the lens array are disposed in a one-to-one correspondence with laser light sources in the laser light source array.

According to a second aspect, this application further provides a time of flight camera module, including: a light emitting assembly and a photosensitive assembly, where the light emitting assembly is the light emitting assembly in the first aspect or any implementation of the first aspect, the laser light source array is configured to emit light, and the light emitted from the laser light source array is projected onto a target object through the lens array; and the photosensitive assembly is configured to receive the light reflected from the target object, and measure a distance to the target object based on a time difference or a phase difference between a time point at which the light is emitted from the light emitting assembly and a time point at which the reflected light is received by the photosensitive assembly.

According to a third aspect, this application further provides a mobile terminal, including the time of flight camera module in the implementation of the second aspect.

The time of flight camera module provided in the second aspect and the mobile terminal provided in the third aspect of embodiments of this application each include the light emitting assembly provided in the first aspect. Therefore, the time of flight camera module and the mobile terminal provided in embodiments of this application can resolve the same technical problems as the light emitting assembly in the foregoing technical solution, and achieve a same expected effect.

According to a fourth aspect, this application further provides a light emitting assembly manufacturing method. The manufacturing method includes:

determining an eccentric distance between a laser light source and a lens based on a target divergence angle of the light emitting assembly and a divergence angle of the laser light source; and forming a laser light source array on a substrate, and disposing a lens array based on the eccentric distance, to obtain the light emitting assembly in which the laser light source array is eccentrically arranged with the lens array.

REFERENCE NUMERALS

01—laser light source; 02—light diffuser; 1—substrate; 2—laser light source; 201—cathode electrode layer; 202—N-type confining layer; 203—active layer; 204—P-type confining layer; 205—anode electrode layer; 206—grating structure; 207—reflector; 208—waveguide; 21—first laser light source; 22—second laser light source; 3—lens; 31—first lens; 4—circuit board; 5—metal bonding structure; 6—transparent cover layer; 7—connecting wire; and 8—power supply unit.

DESCRIPTION OF EMBODIMENTS

Embodiments of this application relate to a light emitting assembly, a time of flight camera module, a mobile terminal, and a light emitting assembly manufacturing method. The following describes in detail the light emitting assembly, the time of flight camera module, the mobile terminal, and the light emitting assembly manufacturing method with reference to accompanying drawings.

Figure 1:
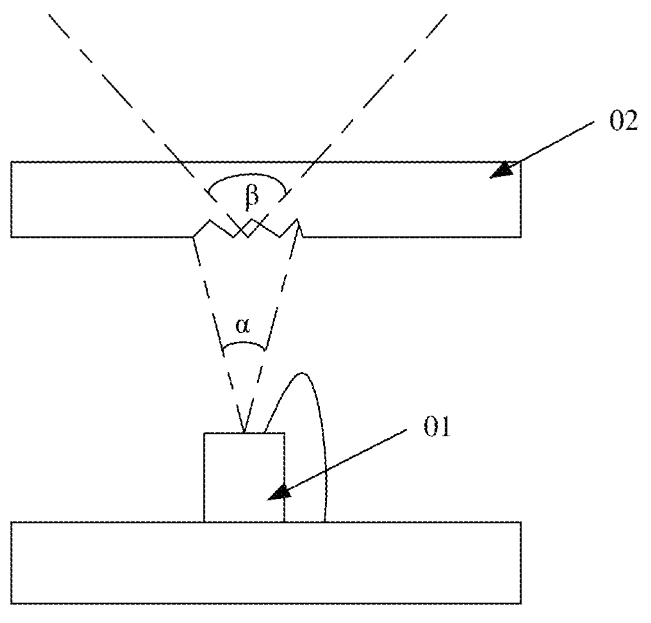
FIG. 1 is a schematic diagram of a structure of a light emitting assembly in the conventional technology.
Figure 2:
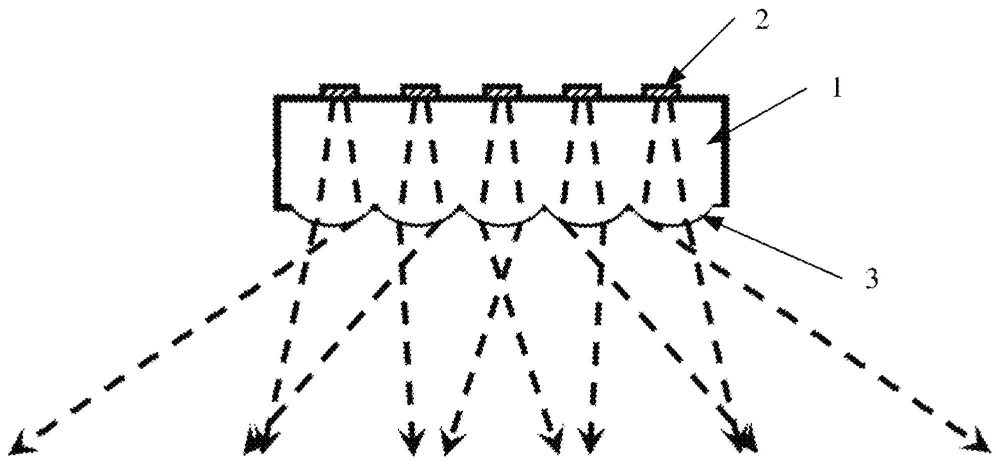
FIG. 2 is a schematic diagram of a structure of a light emitting assembly according to an embodiment of this application.
Figure 3:
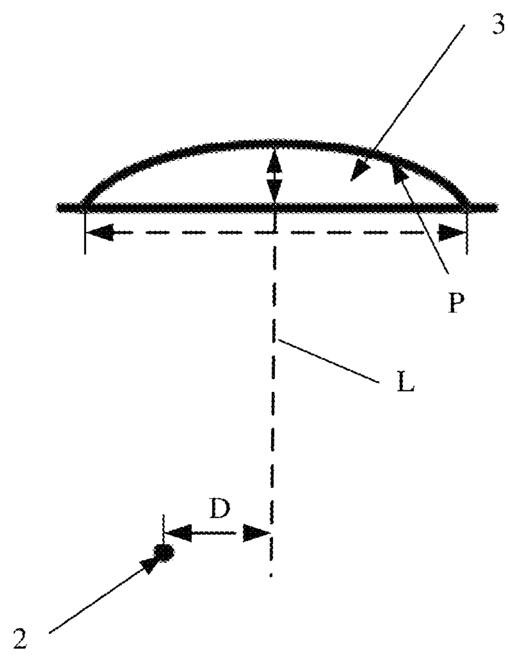
FIG. 3 is a schematic diagram of a location relationship between a laser light source and a lens according to an embodiment of this application.

According to a first aspect, an embodiment of this application provides a light emitting assembly. The light emitting assembly is configured to be disposed in a time of flight camera module. Refer to FIG. 2. The light emitting assembly includes a substrate 1, a laser light source array (including a plurality of laser light sources 2), and a lens array (including a plurality of lenses 3). The laser light source array is disposed on the substrate 1, the lens array is disposed on a light emitting side of the laser light source array, one lens in the lens array is disposed opposite to at least one laser light source in the laser light source array, and at least some laser light sources are eccentrically arranged with corresponding lenses. Refer to FIG. 3. A light emitting surface (a surface P) of the lens 3 is a spherical surface, there is an eccentric distance D between the laser light source 2 and a corresponding lens 3, and the eccentric distance D is a distance between a center of the laser light source 2 and a perpendicular bisector L of the light emitting surface P of the lens 3.

It should be noted that all laser light sources may be eccentrically arranged with corresponding lenses or some laser light sources may be eccentrically arranged with corresponding lenses.

A principle of changing a divergence angle by the light emitting assembly is as follows: When light emitted from the laser light source 2 passes through the lens 3, the light is refracted by the spherical light emitting surface, to change a divergence angle of the light.

Figure 4A:
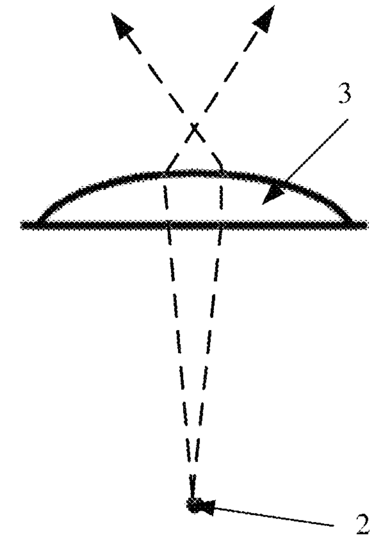
FIG. 4*a* is a schematic diagram of a location relationship when an eccentric distance between a laser light source and a lens is zero according to an embodiment of this application.

Because the light emitting surface of the lens is a spherical surface, in a process of assembling the light emitting assembly, to enable the light refracted by the lens to have a different divergence angle, the eccentric distance between the laser light source and the lens may be changed. When the eccentric distance is different, a shape of an arc surface that is of the lens and that is opposite to the laser light source is different (as shown in FIG. 4*a* and FIG. 4*c*), and an angle of inclination of a normal line of the arc surface is also different. In this way, the divergence angle of the light refracted by the light emitting surface of the lens is also different. A laser light source 2 shown in FIG. 4*a* is a point light source, and an eccentric distance in FIG. 4*a* is zero. A laser light source 2 shown in FIG. 4*c* is a point light source, and an eccentric distance D1 in FIG. 4*c* is greater than zero. A laser light source 2 shown in FIG. 4*d* is an area light source, and an eccentric distance D2 in FIG. 4*d* is also greater than zero.

The laser light source 2 in FIG. 4*a* and the laser light source 2 in FIG. 4*c* are of a same structure, and lenses 3 are also of a same structure. It can be obviously learned from FIG. 4*a* and FIG. 4*c* that when an eccentric distance changes, a divergence angle of light emitted from the lens 3 obviously changes, that is, a formed far-field spot is also different. Therefore, when a laser light source of a same structure and a lens of a same structure are used, a divergence angle of light emitted from the lens is changed by changing an eccentric distance, so that a light emitting assembly with different divergence angles is obtained. Compared with the conventional technology in which a manner of changing a divergence angle by replacing a light diffuser is used, manufacturing costs are reduced, and a complex process of mounting a light diffuser is saved. Different divergence angles are implemented by changing the eccentric distance between the laser light source and the lens, thereby implementing a simple structure and a convenient implementation.

Figure 5A:
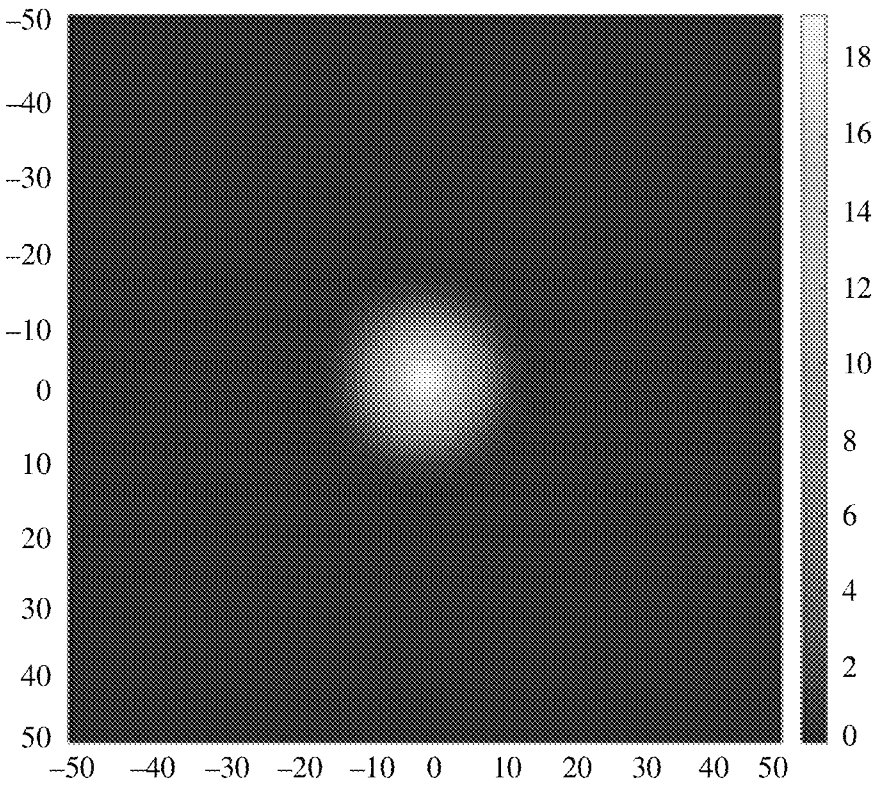
FIG. 5*a* shows a far-field spot formed by a laser light source array whose divergence angle is 20° according to an embodiment of this application.
Figure 5B:
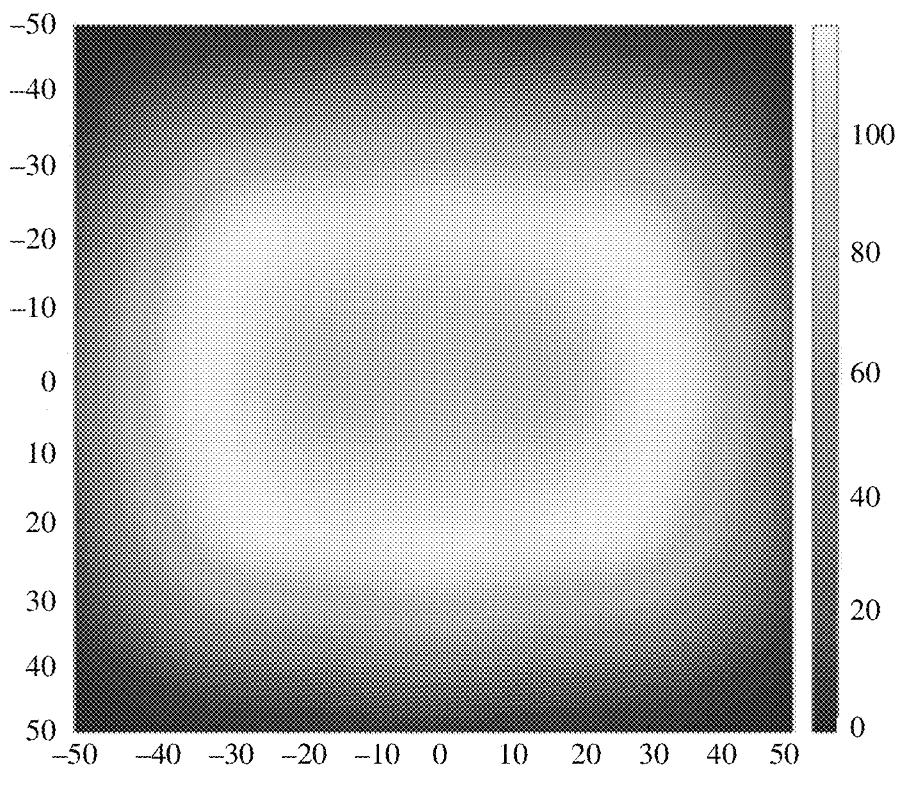
FIG. 5*b* shows a far-field spot formed after light emitted from a laser light source array whose divergence angle is 20° passes through a lens array according to an embodiment of this application.

FIG. 5*a* shows a circular spot formed when a divergence angle of light emitted from the laser light source array is about 20°, and FIG. 5*b* shows a rectangular spot formed when a divergence angle modulated by the lens is greater than 60°.

Figure 4B:
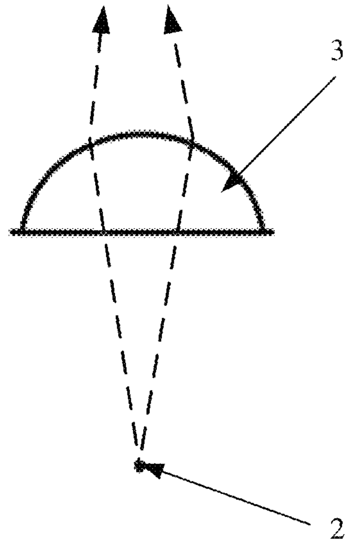
FIG. 4*b* is a schematic diagram of a location relationship when an eccentric distance between a laser light source and a lens is zero according to an embodiment of this application.
Figure 4C:
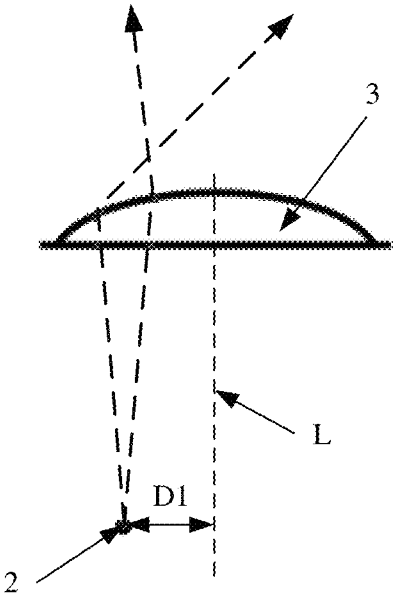
FIG. 4*c* is a schematic diagram of a location relationship when an eccentric distance between a laser light source and a lens is D1 according to an embodiment of this application.
Figure 4D:
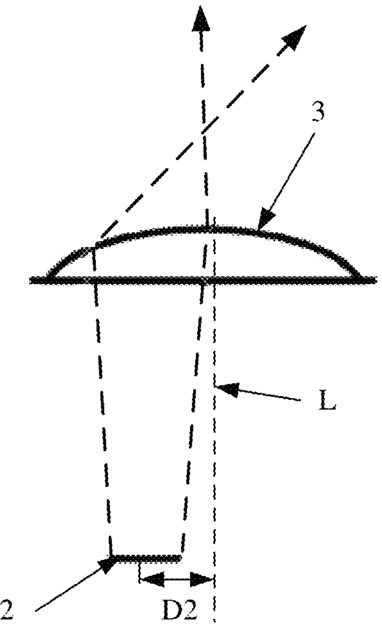
FIG. 4*d* is a schematic diagram of a location relationship when an eccentric distance between a laser light source and a lens is D2 according to an embodiment of this application.

When the eccentric distance between the laser light source 2 and the lens 3 is zero (as shown in FIG. 4*a* and FIG. 4*b*), the divergence angle of the light emitted from the lens may be increased or may be decreased, which is specifically related to a structure size of the lens. However, regardless of an increase or a decrease, a center of a far-field spot formed by the light emitted from the lens is still located on an extension line of the center of the laser light source. In a specific application, if the center of the far-field spot formed by the light emitted from the lens needs to be still located on the extension line of the center of the laser light source, the eccentric distance between the laser light source and the lens is selected to be zero, and a corresponding lens structure is selected based on a change in the divergence angle.

When the eccentric distance between the laser light source 2 and the lens is greater than zero (as shown in FIG. 4*c* and FIG. 4*d*), a center of a far-field spot formed by the light emitted from the lens is not located on the extension line of the center of the laser light source, that is, an offset occurs. A size of a specific offset is related to the eccentric distance. In a specific implementation, if the center of the far-field spot formed by the light emitted from the lens does not need to be located on the extension line of the center of the laser light source, the eccentric distance between the laser light source and the lens should be greater than zero, and the eccentric distance is changed based on an offset.

Refer to FIG. 2, FIG. 6, FIG. 11, and FIG. 12. The lens provided in this embodiment of this application may be a convex lens or a concave lens. In a specific implementation, a lens type may be selected based on a design requirement of the divergence angle.

Figure 7:
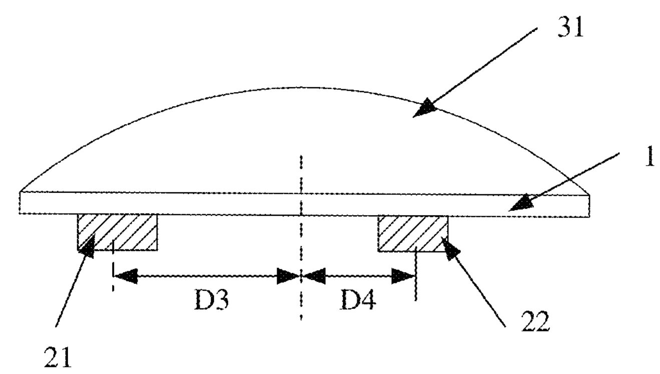
FIG. 7 is a schematic diagram of a location relationship between both of a first laser light source and a second laser light source and a first lens in a light emitting assembly according to an embodiment of this application.

In some implementations, refer to FIG. 7. The laser light source array includes a first laser light source 21 and a second laser light source 22. The lens array includes a first lens 31, where the first lens 31 is disposed on a light emitting side of the first laser light source 21 and a light emitting side of the second laser light source 22, a first eccentric distance between the first laser light source 21 and the first lens 31 is D3, a second eccentric distance between the second laser light source 22 and the first lens 31 is D4, and the first eccentric distance D3 and the second eccentric distance D4 are unequal. That is, when an eccentric distance of the first laser light source 21 and an eccentric distance of the second laser light source 22 are unequal, the first laser light source 21 and the second laser light source 22 may correspond to a same lens. In this way, a generated technical effect may be that one lens is saved. In this way, a structure of the entire light emitting assembly is simplified, and an assembly process of the light emitting assembly is correspondingly simplified.

By analogy, when the laser light source array further includes a third laser light source, a fourth laser light source, a fifth laser light source, and the like, and eccentric distances between the laser light sources and corresponding lenses are unequal, one lens may be used.

Certainly, that a quantity of lenses is equal to a quantity of laser light sources also falls within the protection scope of embodiments of this application, and the lenses are in a one-to-one correspondence with the laser light sources.

Because eccentric distances between every two laser light sources and corresponding lenses can be the same or different, in example embodiments, the laser light sources 2 are in a uniform arrangement, and the lenses 3 are in a non-uniform arrangement; the lenses 3 are in a uniform arrangement, and the laser light sources 2 are in a non-uniform arrangement; or the lenses 3 and the laser light sources 2 are all in a non-uniform arrangement. A specific arrangement manner of the lenses and the laser light sources can be determined based on an actual requirement.

In some implementations, the laser light source array forms N light emitting regions, there are at least two laser light sources in each light emitting region, N is an integer greater than 1, and eccentric distances of some laser light sources in every two light emitting regions are equal or eccentric distances of all laser light sources in every two light emitting regions are unequal.

That is, because the eccentric distances of some laser light sources in every two light emitting regions are equal or the eccentric distances of all laser light sources in every two light emitting regions are unequal, far-field spots formed by any two light emitting regions are different.

Figure 8:
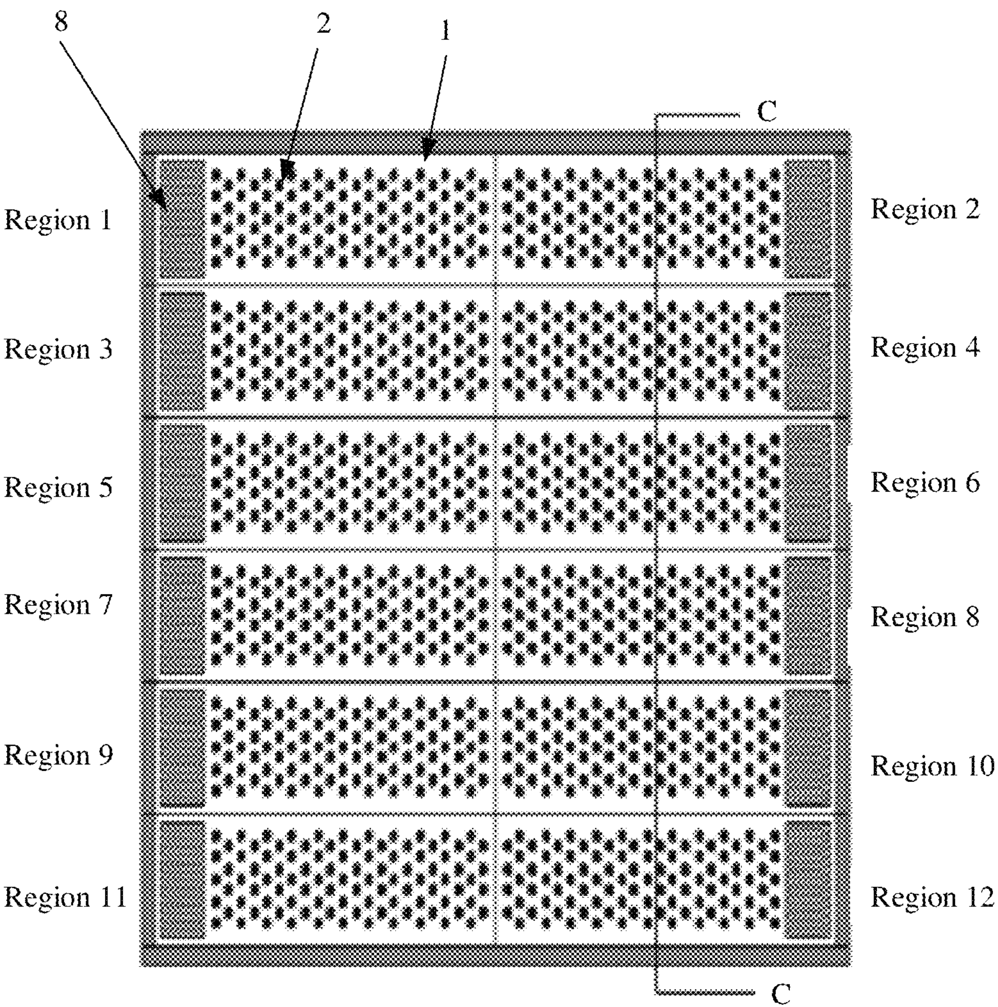
FIG. 8 is a schematic diagram of a structure in which a laser light source array in a light emitting assembly forms 12 light emitting regions according to an embodiment of this application.
Figure 9:
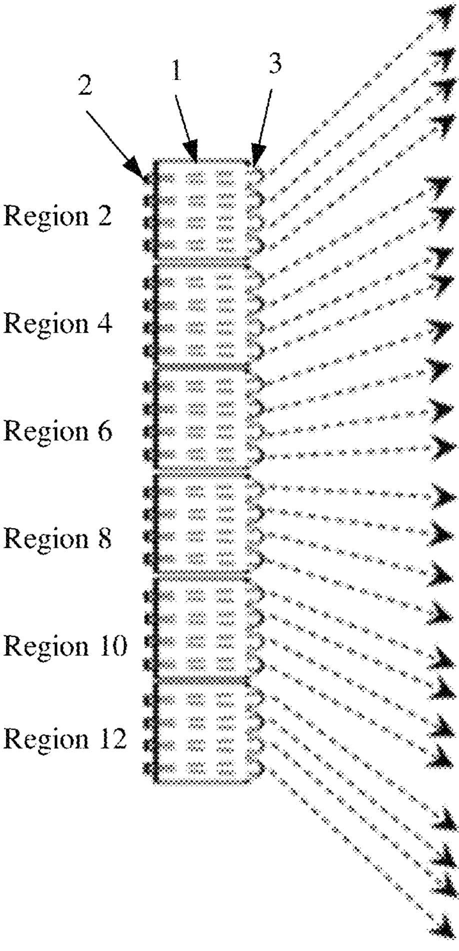
FIG. 9 is a C-C sectional view of FIG. 8.
Figure 10:
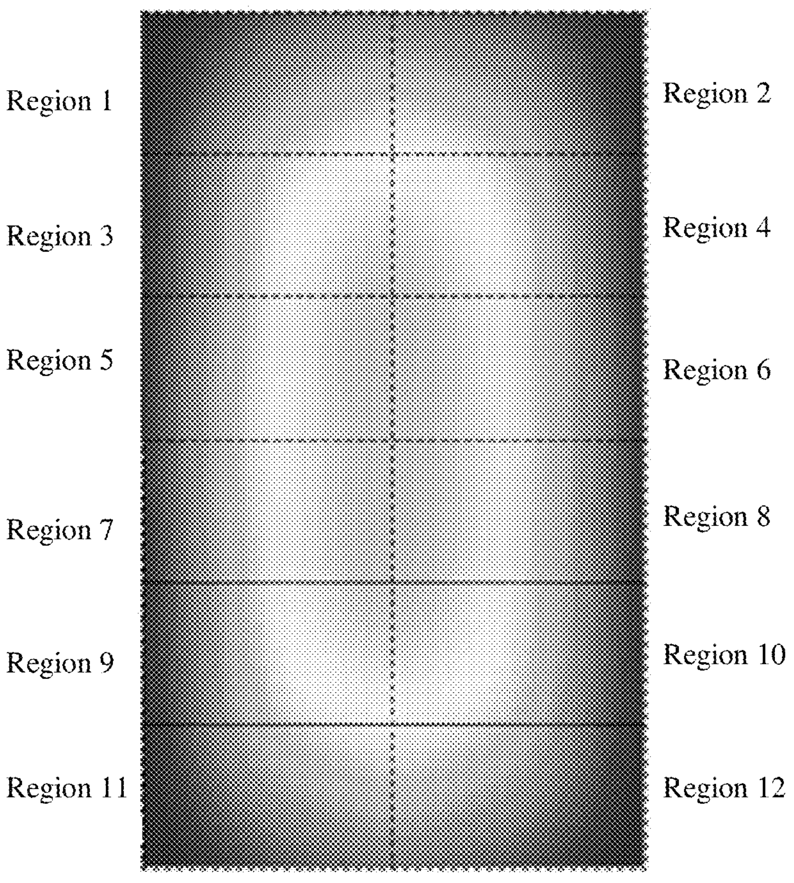
FIG. 10 is a diagram of far-field spots formed in FIG. 8.

For example, refer to FIG. 8. The laser light source array 2 is divided into 12 light emitting regions. The 12 light emitting regions are arranged in a 2*6 array, and are respectively a region 1, a region 2, a region 3, a region 4, . . . , and a region 12. FIG. 9 is a C-C sectional view of FIG. 8. It can be learned from FIG. 9 that eccentric distances between every two laser light sources in the region 2 and corresponding lenses are different, and an eccentric distance between a laser light source in the region 2 and a corresponding lens is also different from an eccentric distance of any laser light source in the region 4, the region 6, the region 8, the region 10, and the region 12. FIG. 10 shows final far-field spots formed by the region 1, the region 2, the region 3, the region 4, . . . , and the region 12. A far-field spot formed by the region 1 is different from a far-field spot formed by any one of the region 2, the region 3, . . . , and the region 12. That is, in a specific implementation, if a target far-field spot shown in FIG. 10 needs to be formed, the target far-field spot is divided into 12 regions, so that each region is a target far-field sub-spot. In addition, the 12 light emitting regions of the laser light source array are in a one-to-one correspondence with the 12 regions of the target far-field spot, and a far-field spot formed by each light emitting region of the laser light source array is consistent with a corresponding target far-field sub-spot. In this way, depth measurement is implemented.

In addition, refer to FIG. 8. Each light emitting region has a corresponding power supply unit 8. The power supply unit 8 is configured to turn on and turn off all laser light sources in a corresponding light emitting region, and a plurality of power supply units 8 are connected in parallel.

In the solution provided in this embodiment of this application, when long-distance ranging is performed, only one light emitting region may be turned on each time. After ranging is performed by using laser light sources in the light emitting region, laser light sources in another light emitting region are turned on, so that two-dimensional scanning lighting is implemented.

In addition, there are two structures for implementing two-dimensional scanning. In a first manner, there are a plurality of laser light sources, the plurality of laser light sources are in a two-dimensional arrangement, and all the laser light sources are turned on or turned off by using the power supply unit at one time, to implement two-dimensional scanning. In a second manner, laser light sources are in a linear arrangement or a point arrangement, the laser light sources that are in the point arrangement or the linear arrangement are driven by a mechanical scanner to move in a two-dimensional direction, to implement two-dimensional scanning. The first structure can quickly complete two-dimensional scanning. However, the laser light sources are all turned on or turned off each time. Consequently, luminance of the laser light sources is insufficient, and further long-distance ranging cannot be implemented. A quantity of laser light sources in the second structure is less than a quantity of laser light sources in the first structure, and the laser light sources are driven by the mechanical scanner to move. In this way, luminance of the laser light sources in the second structure is higher than that of the laser light sources in the first structure, and further long-distance ranging is implemented. However, a size of the entire light emitting assembly is increased due to disposing the mechanical scanner.

Compared with the first structure and the second structure, the two-dimensional scanning structure provided in this embodiment of this application has the following advantages: Compared with the first structure, on a premise of implementing large-scale scanning, only one light emitting region is turned on each time, so that luminance of laser light sources is improved. For example, if an input power for all the laser light sources is 20 W and there are 100 laser light sources, when the first solution is used, an input current of each laser light source is 0.1 A. If the solution provided in this embodiment of this application is used, the laser light sources are divided into 10 regions, and each region has 10 laser light sources. Each time turn-on is performed, an input current of each laser light source is 1 A. In this way, luminance of the laser light sources is obviously improved. Therefore, compared with the first scanning structure, long-distance ranging can be implemented, and power consumption is effectively reduced. Compared with the second scanning structure, no mechanical scanner needs to be disposed, a size is reduced, and manufacturing costs are effectively reduced.

A connection relationship between the laser light source 2 and the substrate 1 is described by using the following two embodiments.

The laser light source described below includes a cathode electrode layer 201, an N-type confining layer 202, an active layer 203, a P-type confining layer 204, and an anode electrode layer 205. Certainly, in addition to these structures, the laser light source further includes a structure with another function.

Figure 13:
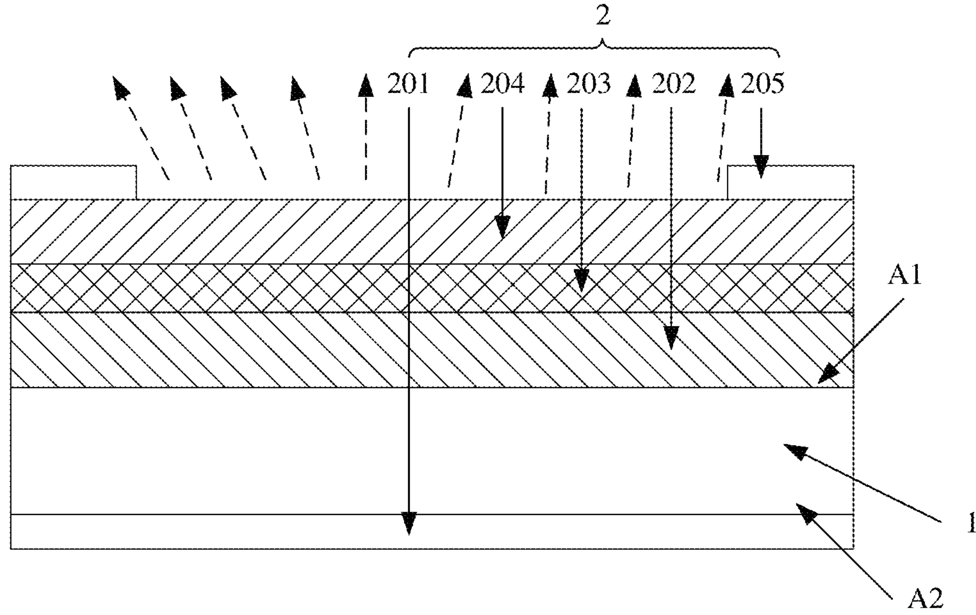
FIG. 13 is a schematic diagram of a connection relationship between a substrate and a laser light source in a light emitting assembly according to an embodiment of this application.

In Embodiment 1, refer to FIG. 13. The substrate 1 has a first surface A1 and a second surface A2 that are opposite to each other. The cathode electrode layer 201 is disposed on the second surface A2, and the N-type confining layer 202, the active layer 203, the P-type confining layer 204, and the anode electrode layer 205 are stacked on the first surface A1 from bottom to top. The lens is disposed on one side of the first surface A1, and the light emitting surface of the lens is opposite to the first surface A1. In addition, the substrate is made of a conductive material.

That is, the anode electrode layer 205 and the cathode electrode layer 201 of the laser light source 2 are located on two sides of the substrate 1. In other words, the cathode electrode layer and the anode electrode layer are not coplanar.

Figure 14:
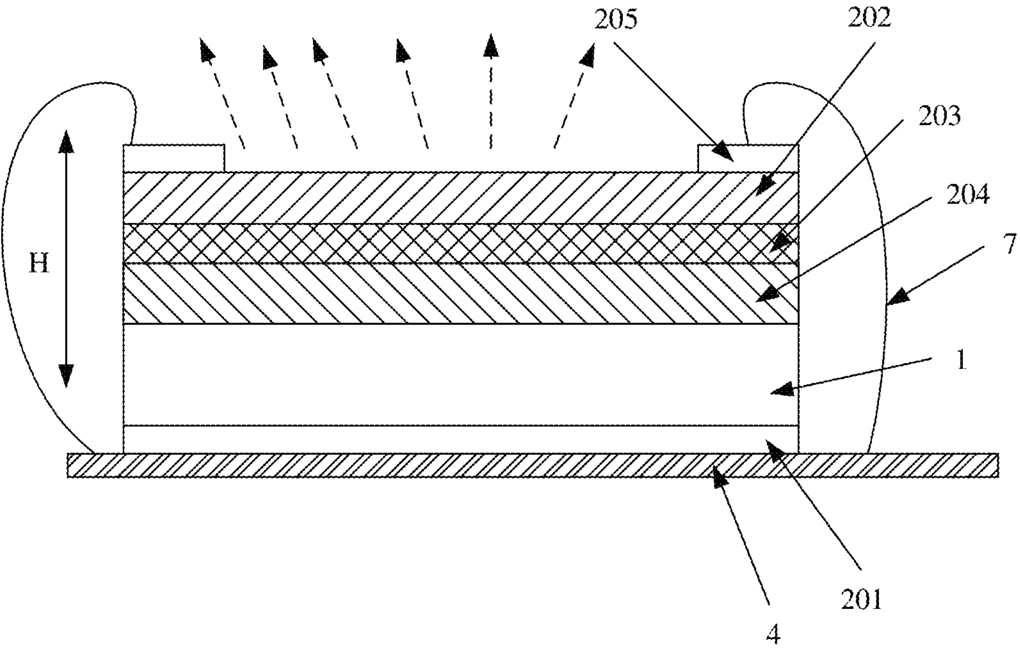
FIG. 14 is a schematic diagram of a connection relationship between a substrate and both of a laser light source and a circuit board in a light emitting assembly according to an embodiment of this application.

In some implementations, refer to FIG. 14. The light emitting assembly further includes a circuit board 4, where a drive circuit (not shown in the figure) is disposed on the circuit board 4, the cathode electrode layer 201 is electrically connected to a cathode pin of the drive circuit by using a welding structure, and the anode electrode layer 205 is electrically connected to an anode pin of the drive circuit through a connecting wire 7.

The cathode electrode layer 201 faces the circuit board 4. In this way, the cathode electrode layer can be connected to the drive circuit on the circuit board by using the welding structure. In addition, the anode electrode layer 205 is located on one side of the first surface of the substrate, and the anode electrode layer is connected to the drive circuit through the connecting wire.

Figure 15:
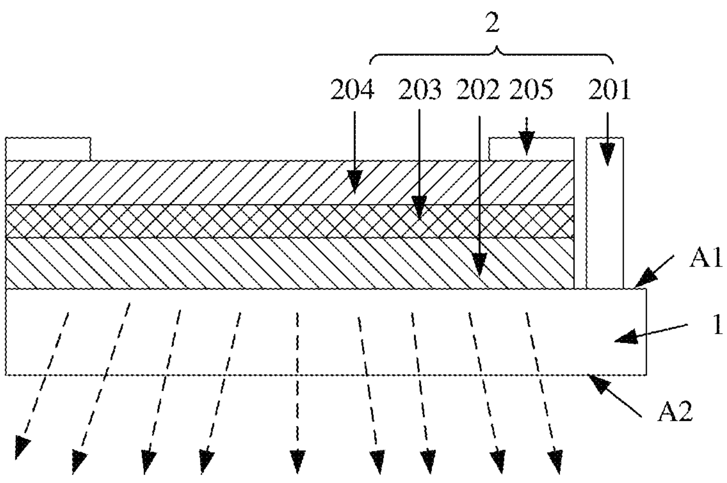
FIG. 15 is a schematic diagram of a connection relationship between a substrate and a laser light source in a light emitting assembly according to an embodiment of this application.

In Embodiment 2, refer to FIG. 15. The substrate 1 is a transparent substrate, and the substrate 1 has a first surface A1 and a second surface A2 that are opposite to each other. The N-type confining layer 202, the active layer 203, and the P-type confining layer 204 are stacked on the first surface A1 from bottom to top, the cathode electrode layer 201 is further disposed on the first surface A1, and the anode electrode layer 205 is disposed on the P-type confining layer 204. The lens is disposed on one side of the second surface A2, and the light emitting surface of the lens is opposite to the second surface. In addition, the substrate is made of a conductive material.

That is, the anode electrode layer 205 and the cathode electrode layer 201 of the laser light source 2 are located on a same side of the substrate 1. In other words, the cathode electrode layer and the anode electrode layer are coplanar.

To improve transmittance of the substrate to light, an antireflective film may be disposed on the second surface of the substrate.

Figure 16:
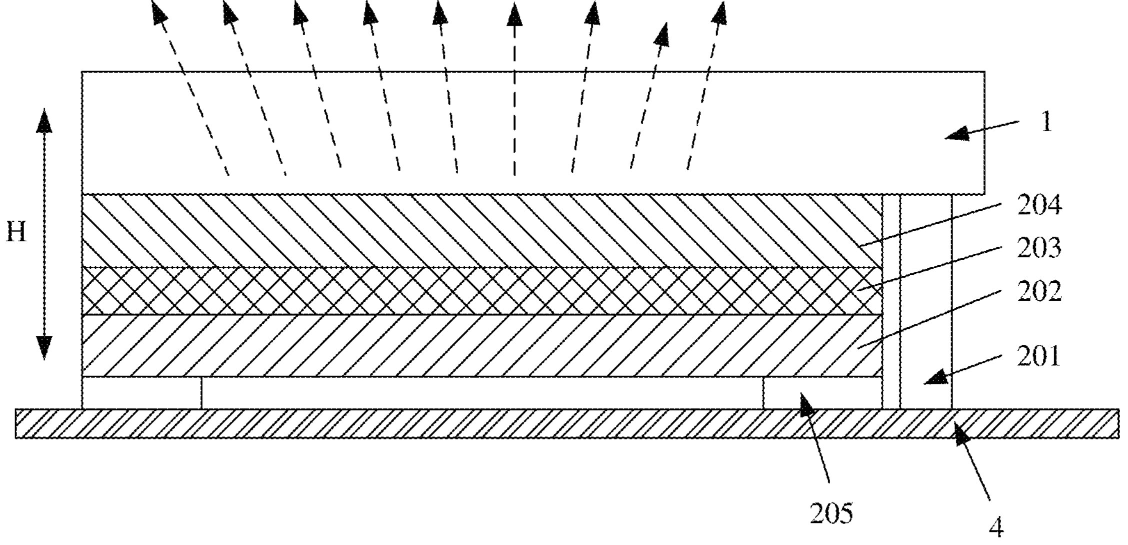
FIG. 16 is a schematic diagram of a connection relationship between a substrate and both of a laser light source and a circuit board in a light emitting assembly according to an embodiment of this application.

In some implementations, refer to FIG. 16. The light emitting assembly further includes a circuit board 4, where a drive circuit (not shown in the figure) is disposed on the circuit board 4, the anode electrode layer 205 is electrically connected to an anode pin of the drive circuit by using a first welding structure, and the cathode electrode layer 201 is electrically connected to a cathode pin of the drive circuit by using a second welding structure.

A technical effect that can be achieved in the technical solution provided in Embodiment 2 is as follows: The anode electrode layer 205 and the cathode electrode layer 201 of the laser light source 2 are located on one side of the first surface of the substrate 1, and the first surface of the substrate faces the circuit board 4. In this way, the anode electrode layer and the cathode electrode layer can be electrically connected to the corresponding anode pin and the corresponding cathode pin of the drive circuit by using the welding structures. Compared with Embodiment 1 in which a connection manner of using the connecting wire is used, an operation process is simplified, and a size of the entire light emitting assembly in a height direction (for example, a direction H in FIG. 16) is correspondingly reduced, so that the entire light emitting assembly meets a miniaturization design requirement.

Figure 11:
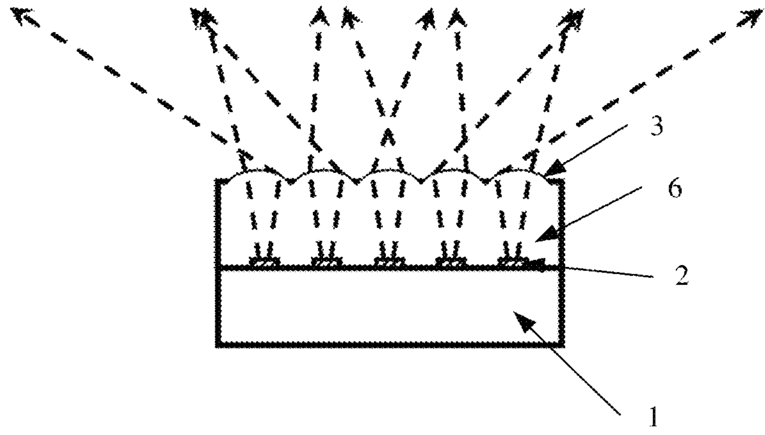
FIG. 11 is a schematic diagram of a structure of a light emitting assembly according to an embodiment of this application.
Figure 12:
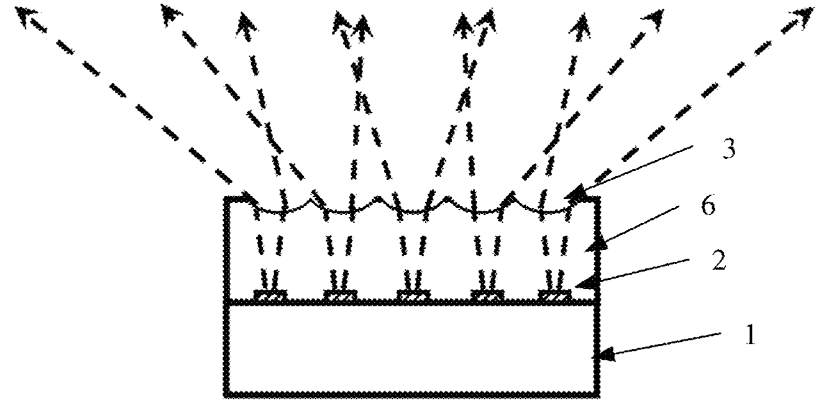
FIG. 12 is a schematic diagram of a structure of a light emitting assembly according to an embodiment of this application.

When the light emitting assemblies shown in FIG. 11 and FIG. 12 are used, the first surface of the substrate 1 on which the N-type confining layer, the active layer, the P-type confining layer, and the anode electrode layer are formed is covered with a transparent cover layer 6, and the lens 3 is formed on one side that is of the transparent cover layer 6 and that is away from the first surface. The transparent cover layer is covered on the first surface that has the laser light source, so that the lens is formed on the side that is of the transparent cover layer and that is away from the first surface, thereby effectively ensuring connection strength of the lens.

In addition, a material of the transparent cover layer 6 may be a transparent material, for example, a semiconductor or an organic substance.

The active layer 203 has a microcavity structure of a micron dimension, and both the N-type confining layer 202 and the P-type confining layer 204 are distributed Bragg reflectors. In this way, the formed laser light source 2 is a vertical cavity surface emitting laser (VCSEL). The vertical cavity surface emitting laser has a small volume, a circular output spot, a single longitudinal mode output, a small threshold current, low costs, and easy integration. In addition, the vertical cavity surface emitting laser has a smaller divergence angle than that of a light-emitting diode (LED), a more even light emitting wavelength at 850 nm or 940 nm, a narrower spectral width, and better miscellaneous light interference resistance, and has far better performance than that of the LED in 3D recognition and ranging.

Figure 17A:
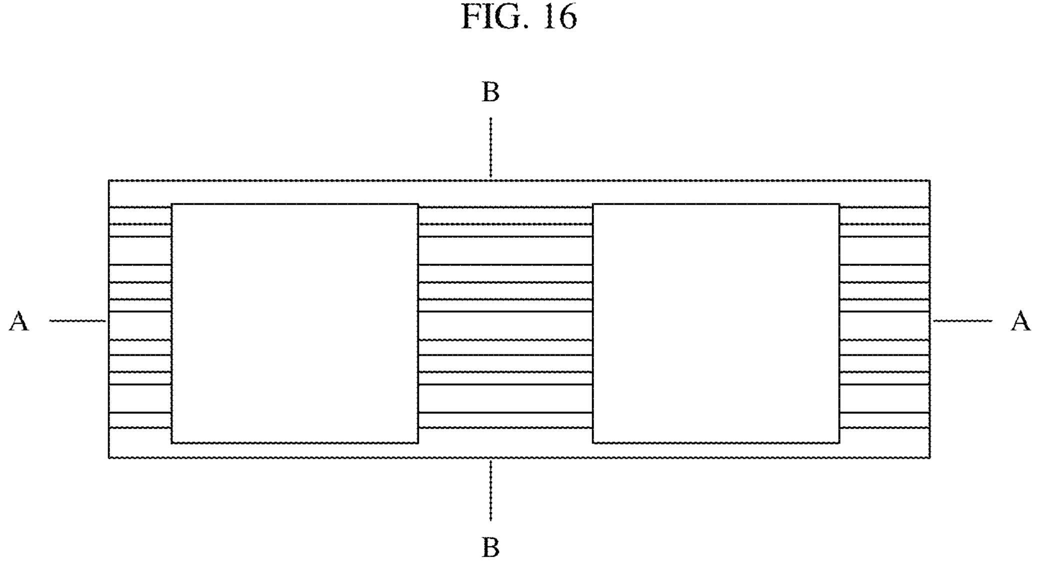
FIG. 17*a* is a schematic diagram of a structure of a light emitting assembly according to an embodiment of this application.
Figure 17B:
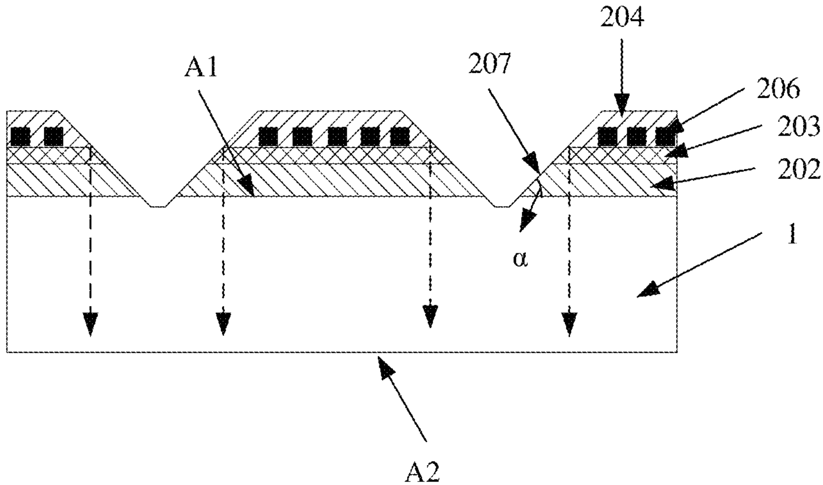
FIG. 17*b* is an A-A sectional view of FIG. 17*a;*
Figure 17C:
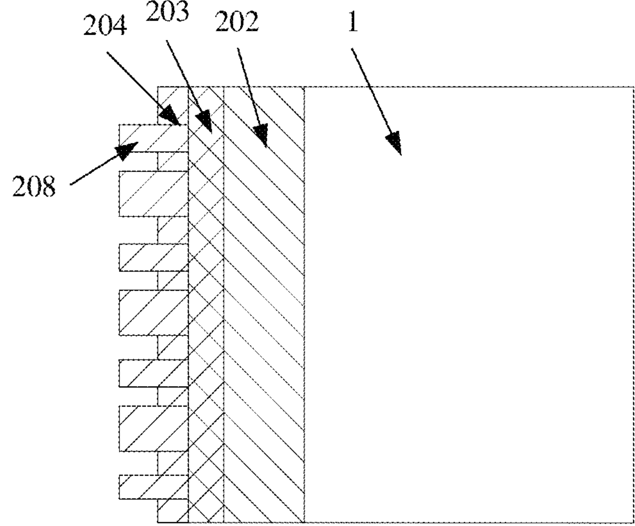
FIG. 17*c* is a B-B sectional view of FIG. 17*a;*

An embodiment of this application further provides another laser light source 2. As shown in FIG. 17*a*, FIG. 17*b*, and FIG. 17*c*, the laser light source includes an N-type confining layer 202 and a P-type confining layer 204 that are opposite to each other, and an active layer 203 located between the N-type confining layer 202 and the P-type confining layer 204. A grating structure 206 is disposed in the P-type confining layer 204, and the grating structure 206 is configured to provide feedback in an optical transmission direction, to implement a horizontal resonant cavity parallel to the active layer 203. A waveguide 208 is formed on one side that is of the P-type confining layer 204 and that is away from the active layer 203, and the waveguide 208 is configured to limit a lateral light field. Locations that are of the horizontal resonant cavity and that are located at a light inlet and a light outlet of the waveguide 208 each have a reflector 207 formed through etching or corrosion. The reflector 207 can perform total reflection on light output by the waveguide 208, to emit the light.

For example, refer to FIG. 17*b*. The substrate 1 is transparent, the laser light source is located on the first surface A1 of the substrate, and the reflector 207 can emit the light from the second surface A2 of the substrate 1. An angle of inclination a of the reflector 207 may be 45°.

Figure 17D:
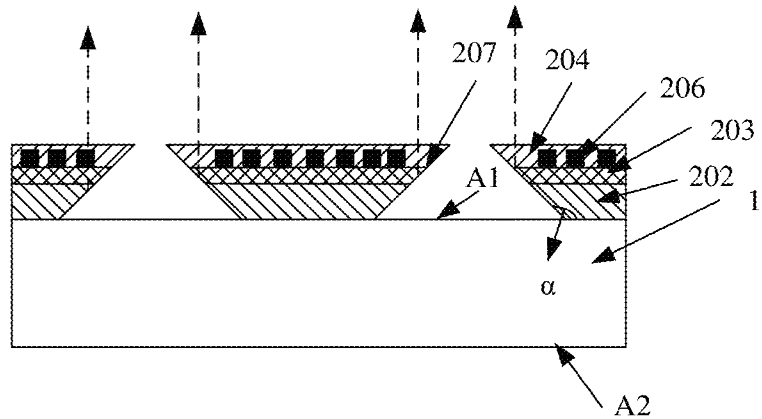
FIG. 17*d* is a schematic diagram of a connection relationship between a substrate and a laser light source in a light emitting assembly according to an embodiment of this application.

For another example, refer to FIG. 17*d*. The laser light source is located on the first surface A1 of the substrate. Compared with FIG. 17*b*, the reflector 207 can emit the light from one side of the first surface A1. A difference between FIG. 17*b* and FIG. 17*d* is that the reflector 207 has different settings for the angle of inclination. In this way, the light can be emitted from the second surface A2 or from one side of the first surface A1. The angle of inclination a of the reflector 207 may be 135°.

The laser light source provided in this embodiment can implement both short-wavelength transmission and long-wavelength transmission, for example, perform transmission at a wavelength of 1550 nm.

In the laser light source structures shown in FIG. 17*a*, FIG. 17*b*, and FIG. 17*c*, to increase transmittance of light through the substrate, an antireflective film may be disposed on the second surface of the substrate.

A structure of the waveguide provided in this embodiment may be a rectangular waveguide or may be a ridge waveguide.

In some implementations, a distance between two adjacent waveguides is greater than or equal to 8 μm. A distance between two adjacent reflection cavities is 50 μm or 100 μm.

A material of the substrate may be a semiconductor material, for example, InP or GaAs, and a material of an active region may be a semiconductor material, for example, InGaAsP, InGaAs, or AlGaAs.

If the laser light source shown in FIG. 17*a*, FIG. 17*b*, and FIG. 17*c* is used, an anode electrode layer of the laser light source is disposed on the P-type confining layer, and a cathode electrode layer is disposed on the first surface of the substrate. That is, the anode electrode layer and the cathode electrode layer of the laser light source 2 of this structure are located on a same side of the substrate. In other words, the cathode electrode layer and the anode electrode layer are coplanar.

If the laser light source shown in FIG. 17*d* is used, an anode electrode layer of the laser light source is disposed on the P-type confining layer, and a cathode electrode layer is disposed on the second surface of the substrate. That is, the anode electrode layer and the cathode electrode layer of the laser light source 2 of this structure are located on two sides of the substrate. In other words, the cathode electrode layer and the anode electrode layer are not coplanar.

There are a plurality of cases for a connection structure between the lens 3 and the substrate 1. The following describes the connection structure by using two embodiments.

Figure 6:
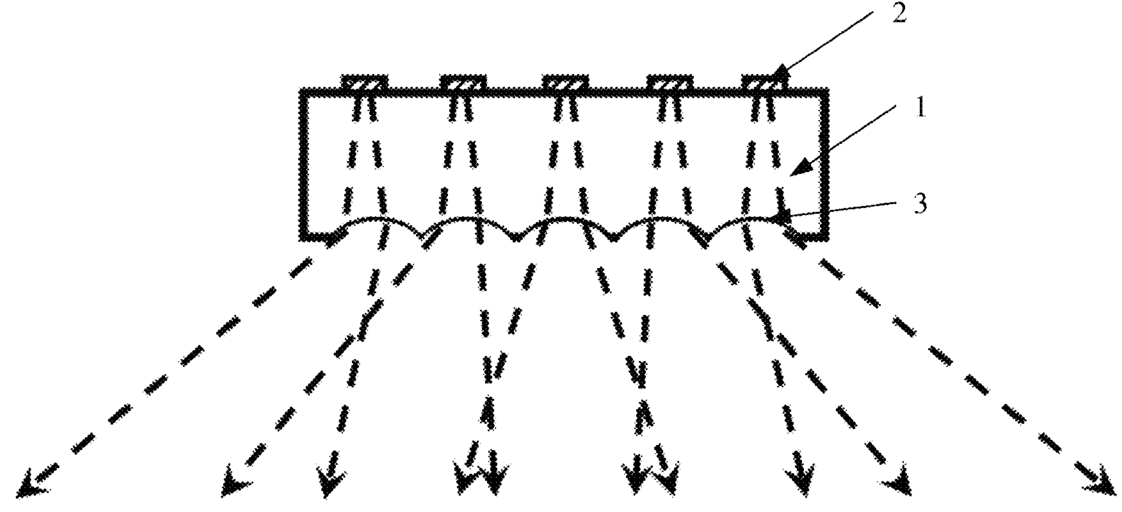
FIG. 6 is a schematic diagram of a structure of a light emitting assembly according to an embodiment of this application.

In Embodiment 1, refer to FIG. 2 and FIG. 6. The lens 3 is integrally formed with the substrate 1. For example, as shown in FIG. 2, when the laser light source 2 is located on the first surface of the substrate 1, the lens 3 may be directly formed on the second surface of the substrate 1.

Figure 18:
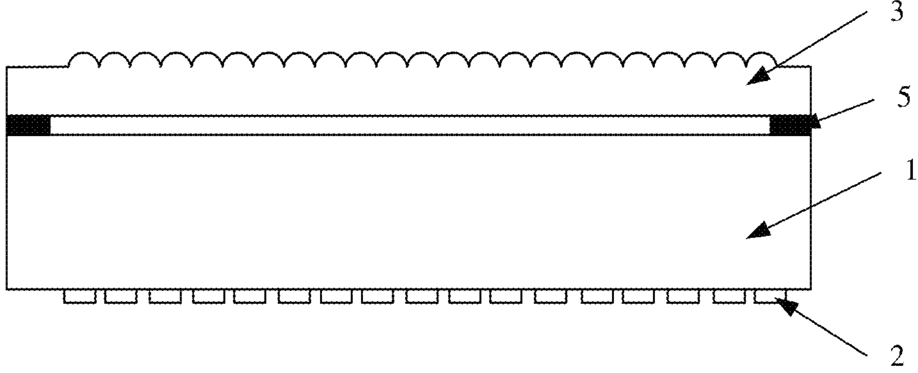
FIG. 18 is a schematic diagram of a structure of a light emitting assembly according to an embodiment of this application.

In Embodiment 2, refer to FIG. 18. The lens 3 is connected to the substrate 1 by using a metal bonding structure 5.

The lens 3 is connected to the substrate 1 by using the foregoing two embodiments. A technical effect that can be achieved is: Compared with a bonding manner, in the integration manner or the manner in which the metal bonding structure is used, connection strength between the lens and the substrate is improved. In particular, when the divergence angle is changed based on the eccentric distance between the lens and the laser light source, and an integrated structure or a connection structure of the metal bonding structure is used, mechanical strength is larger. Compared with the conventional technology, a detector configured to detect whether a light diffuser falls off is saved. Therefore, in the light emitting assembly provided in this embodiment of this application, divergence angle changing capability is provided, and the structure of the entire light emitting assembly is simplified, thereby implementing a miniaturization design.

Figure 19:
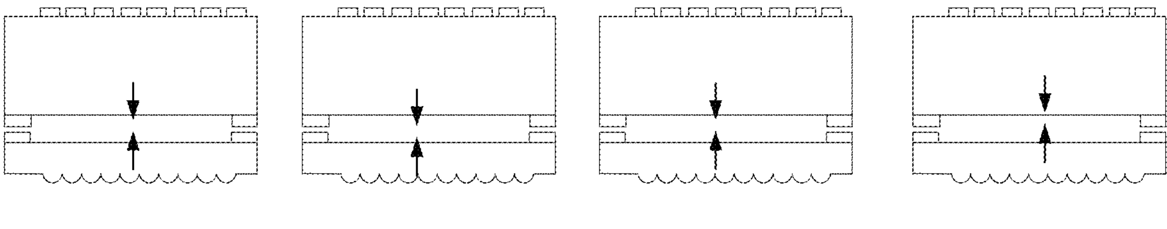
FIG. 19 is a schematic diagram of a structure in which a plurality of light emitting assemblies are formed according to an embodiment of this application.
Figure 20:
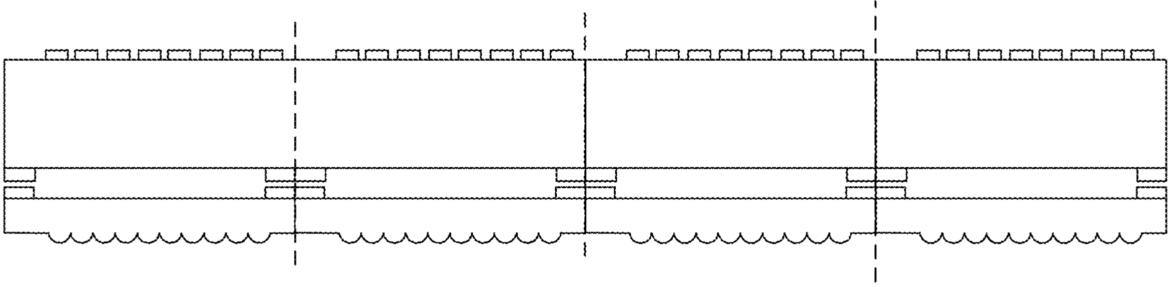
FIG. 20 is a schematic diagram of a structure in which a plurality of light emitting assemblies are formed according to an embodiment of this application.

In a specific implementation, a plurality of light emitting assemblies may be required. There are two embodiments for implementing a plurality of light emitting assemblies. For example, refer to FIG. 19. The substrate on which a plurality of laser light sources are disposed is cleaved into a plurality of sub-substrates, the lens is cleaved into a plurality of sub-lenses, and metallic bonding is performed between each sub-lens and a sub-substrate to form a plurality of light emitting assemblies. For another example, refer to FIG. 20. The lens is connected, by using a metal bonding structure, to the substrate on which a plurality of laser light sources are disposed, and then the substrate and the lens that are integrated are cleaved, to form a plurality of light emitting assemblies.

According to a second aspect, an embodiment of this application further provides a manufacturing method for manufacturing the light emitting assembly according to the first aspect. The manufacturing method includes:

determining an eccentric distance between a laser light source and a lens based on a target divergence angle of the light emitting assembly and a divergence angle of the laser light source; and forming a laser light source array on a substrate, and disposing a lens array based on the eccentric distance, to obtain the light emitting assembly in which the laser light source array is eccentrically arranged with the lens array.

In a specific implementation, the final target divergence angle needs to be determined first, and then the eccentric distance between the laser light source and the lens is determined based on the divergence angle of the laser light source. The eccentric distance may be zero or may be greater than zero. A specific size of the eccentric distance further needs to be determined based on a size of the target divergence angle. Then the laser light source array is manufactured on the substrate; and the lens array is disposed on a light emitting side of the laser light source array based on the determined eccentric distance, to obtain the light emitting assembly in which the laser light source array is eccentrically arranged with the lens array.

When the light emitting assembly shown in FIG. 2 needs to be manufactured, the lens array is obtained by photoetching, based on the determined eccentric distance, a surface that is of the substrate 1 and that is opposite to the laser light source array. Alternatively, refer to FIG. 18. The lens array is connected to the substrate by using a metal bonding structure 5. When the light emitting assembly shown in FIG. 11 needs to be manufactured, a transparent cover layer 6 is deposited on one side that is of the substrate 1 and on which the laser light source array is formed, and then the lens array is obtained by photoetching, based on the determined eccentric distance, a side surface that is of the transparent cover layer 6 and that is away from the substrate.

In a process of manufacturing the light emitting assembly by using the manufacturing method, the eccentric distance between the laser light source and a corresponding lens may be adjusted at any time based on the size of the target divergence angle of the light emitting assembly. In this way, the light emitting assembly with different target divergence angles can be manufactured by using a lens of a same structure. That is, different products can be manufactured by using a part of a same structure and only changing a relative location relationship between parts. Compared with a manner of manufacturing different products by using parts of different structures, manufacturing costs are effectively reduced.

According to a third aspect, an embodiment of this application further provides a time of flight camera module. The time of flight camera module includes a photosensitive assembly and the light emitting assembly provided in the foregoing embodiment, where the laser light source array is configured to emit light, and the light emitted from the laser light source array is projected onto a target object through the lens array; and the photosensitive assembly is configured to receive the light reflected from the target object, and measure a distance to the target object based on a time difference or a phase difference between a time point at which the light is emitted from the light emitting assembly and a time point at which the reflected light is received by the photosensitive assembly.

The time of flight camera module includes the light emitting assembly provided in the foregoing embodiment, and a divergence angle of the light emitted from the laser light source array is increased through an eccentric arrangement between the laser light source array and the lens array. In this way, the time of flight camera module can obtain a maximum detection range, and use performance of the time of flight camera module is improved. In addition, when the time of flight camera module is specifically manufactured, if the target divergence angle is to be changed, the target divergence angle may be changed by changing the eccentric distance between the laser light source and the lens.

According to a fourth aspect, an embodiment of this application further provides a mobile terminal. The mobile terminal includes the time of flight camera module provided in the foregoing embodiment. For example, the mobile terminal may be a mobile phone, a tablet computer, or another electronic device.

For example, when the time of flight camera module is used in a mobile phone, a divergence angle is increased through the eccentric arrangement between the laser light source array and the lens array. In this way, when shooting is performed by using the mobile phone, depth information of an image in a large field range can be obtained. In addition, compared with an existing manner of increasing a divergence angle by using a light diffuser, a time of flight camera module in an existing mobile phone further includes, in addition to the light diffuser, a detector configured to monitor whether the light diffuser falls off. However, when the time of flight camera module that is provided in this embodiment of this application and in which the lens array is integrally formed with the substrate or the lens array is connected to the substrate by using the metal bonding structure is used in a mobile phone, no detector needs to be disposed. In this way, a quantity of parts in the mobile phone can be reduced, and the detector is prevented from occupying a space in the mobile phone.

In the descriptions of this specification, the specific features, structures, materials, or characteristics may be combined in a proper manner in any one or more of embodiments or examples.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A light emitting assembly, comprising:

a substrate;

a laser light source array, wherein the laser light source array is disposed on the substrate; and a lens array, wherein the lens array is disposed on a light emitting side of the laser light source array, each lens in the lens array is disposed opposite to at least one laser light source in the laser light source array, a light emitting surface of the each lens is a spherical surface, and at least some laser light sources in the laser light source array are eccentrically arranged with corresponding lenses in the lens array, wherein the laser light source array forms N light emitting regions, there are at least two laser light sources in each light emitting region of the N light emitting regions, N is an integer greater than 1, and eccentric distances of some laser light sources in every two light emitting regions are equal or eccentric distances of all laser light sources in every two light emitting regions are unequal, and wherein each light emitting region of the N light emitting regions has a respective power supply unit of a plurality of power supply units, the respective power supply unit is configured to turn on and turn off all laser light sources in a corresponding light emitting region of the N light emitting regions, and the plurality of power supply units are connected in parallel.

2. The light emitting assembly according to claim 1, wherein the laser light source array comprises a first laser light source and a second laser light source that are adjacent to each other, the lens array comprises a first lens, the first lens is disposed on a light emitting side of the first laser light source and a light emitting side of the second laser light source, an eccentric distance between the first laser light source and the first lens is a first eccentric distance, an eccentric distance between the second laser light source and the first lens is a second eccentric distance, and the first eccentric distance and the second eccentric distance are unequal.

3. The light emitting assembly according to claim 1, wherein the substrate is made of a transparent conductive material and has a first surface and a second surface that are opposite to each other;

wherein the laser light source comprises an N-type confining layer, an active layer, a P-type confining layer, an anode electrode layer, and a cathode electrode layer;

wherein the N-type confining layer, the active layer, the P-type confining layer, and the anode electrode layer are stacked on the first surface from bottom to top respectively, and the cathode electrode layer is also disposed on the first surface; and wherein the lens array is disposed on one side of the second surface, and the light emitting surface of the lens array is opposite to the second surface.

4. The light emitting assembly according to claim 3, wherein the light emitting assembly further comprises a circuit board, a drive circuit is disposed on the circuit board, the cathode electrode layer is electrically connected to a cathode pin of the drive circuit by using a first welding structure, and the anode electrode layer is electrically connected to an anode pin of the drive circuit by using a second welding structure.

5. The light emitting assembly according to claim 3, wherein the lens array is integrally formed with the substrate, or the lens array is connected to the substrate by using a metal bonding structure.

6. The light emitting assembly according to claim 1, wherein the substrate is made of a conductive material, and the substrate has a first surface and a second surface that are opposite to each other;

wherein the laser light source comprises an N-type confining layer, an active layer, a P-type confining layer, an anode electrode layer, and a cathode electrode layer;

wherein the N-type confining layer, the active layer, the P-type confining layer, and the anode electrode layer are stacked on the first surface from bottom to top respectively, and the cathode electrode layer is disposed on the second surface; and wherein the lens array is disposed on one side of the first surface, and the light emitting surface of the lens array is opposite to the first surface.

7. The light emitting assembly according to claim 6, wherein the light emitting assembly further comprises a circuit board, a drive circuit is disposed on the circuit board, the cathode electrode layer is electrically connected to a cathode pin of the drive circuit by using a welding structure, and the anode electrode layer is electrically connected to an anode pin of the drive circuit through a connecting wire.

8. The light emitting assembly according to claim 6, wherein the first surface on which the N-type confining layer, the active layer, the P-type confining layer, and the anode electrode layer are formed is covered with a transparent cover layer, and the lens array is formed on a surface that is of the transparent cover layer and that is opposite to the first surface.

9. A time of flight camera module, comprising:

a light emitting assembly; and a photosensitive assembly, wherein the light emitting assembly comprises:

a substrate;

a laser light source array, wherein the laser light source array is disposed on the substrate; and a lens array, wherein the lens array is disposed on a light emitting side of the laser light source array, each lens in the lens array is disposed opposite to at least one laser light source in the laser light source array, a light emitting surface of the each lens is a spherical surface, and at least some laser light sources in the laser light source array are eccentrically arranged with corresponding lenses in the lens array;

wherein the laser light source array is configured to emit light, and the light emitted from the laser light source array is projected onto a target object through the lens array; and wherein the photosensitive assembly is configured to receive the light reflected from the target object, and measure a distance to the target object based on a time difference or a phase difference between a time point at which the light is emitted from the light emitting assembly and a time point at which the reflected light is received by the photosensitive assembly, wherein the laser light source array forms N light emitting regions, there are at least two laser light sources in each light emitting region of the N light emitting regions, N is an integer greater than 1, and eccentric distances of some laser light sources in every two light emitting regions are equal or eccentric distances of all laser light sources in every two light emitting regions are unequal, and wherein each light emitting region of the N light emitting regions has a respective power supply unit of a plurality of power supply units, the respective power supply unit is configured to turn on and turn off all laser light sources in a corresponding light emitting region of the N light emitting regions, and the plurality of power supply units are connected in parallel.

10. The time of flight camera module according to claim 9, wherein the laser light source array comprises a first laser light source and a second laser light source that are adjacent to each other, the lens array comprises a first lens, the first lens is disposed on a light emitting side of the first laser light source and a light emitting side of the second laser light source, an eccentric distance between the first laser light source and the first lens is a first eccentric distance, an eccentric distance between the second laser light source and the first lens is a second eccentric distance, and the first eccentric distance and the second eccentric distance are unequal.

11. The time of flight camera module according to claim 9, wherein the substrate is made of a transparent conductive material and has a first surface and a second surface that are opposite to each other;

wherein the laser light source comprises an N-type confining layer, an active layer, a P-type confining layer, an anode electrode layer, and a cathode electrode layer;

wherein the N-type confining layer, the active layer, the P-type confining layer, and the anode electrode layer are stacked on the first surface from bottom to top respectively, and the cathode electrode layer is also disposed on the first surface; and wherein the lens array is disposed on one side of the second surface, and the light emitting surface of the lens array is opposite to the second surface.

12. The time of flight camera module according to claim 9, wherein the substrate is made of a conductive material, and the substrate has a first surface and a second surface that are opposite to each other;

wherein the laser light source comprises an N-type confining layer, an active layer, a P-type confining layer, an anode electrode layer, and a cathode electrode layer;

wherein the N-type confining layer, the active layer, the P-type confining layer, and the anode electrode layer are stacked on the first surface from bottom to top respectively, and the cathode electrode layer is disposed on the second surface; and wherein the lens array is disposed on one side of the first surface, and the light emitting surface of the lens array is opposite to the first surface.

13. A mobile terminal comprising a time of flight camera module that comprises:

a light emitting assembly and a photosensitive assembly, wherein the light emitting assembly is the light emitting assembly comprises:

a substrate;

a laser light source array, wherein the laser light source array is disposed on the substrate; and a lens array, wherein the lens array is disposed on a light emitting side of the laser light source array, each lens in the lens array is disposed opposite to at least one laser light source in the laser light source array, a light emitting surface of the each lens is a spherical surface, and at least some laser light sources in the laser light source array are eccentrically arranged with corresponding lenses in the lens array;

wherein the laser light source array is configured to emit light, and the light emitted from the laser light source array is projected onto a target object through the lens array; and wherein the photosensitive assembly is configured to receive the light reflected from the target object, and measure a distance to the target object based on a time difference or a phase difference between a time point at which the light is emitted from the light emitting assembly and a time point at which the reflected light is received by the photosensitive assembly, wherein the laser light source array forms N light emitting regions, there are at least two laser light sources in each light emitting region of the N light emitting regions, N is an integer greater than 1, and eccentric distances of some laser light sources in every two light emitting regions are equal or eccentric distances of all laser light sources in every two light emitting regions are unequal, and wherein each light emitting region of the N light emitting regions has a respective power supply unit of a plurality of power supply units, the respective power supply unit is configured to turn on and turn off all laser light sources in a corresponding light emitting region of the N light emitting regions, and the plurality of power supply units are connected in parallel.

14. The mobile terminal according to claim 13, wherein the laser light source array comprises a first laser light source and a second laser light source that are adjacent to each other, the lens array comprises a first lens, the first lens is disposed on a light emitting side of the first laser light source and a light emitting side of the second laser light source, an eccentric distance between the first laser light source and the first lens is a first eccentric distance, an eccentric distance between the second laser light source and the first lens is a second eccentric distance, and the first eccentric distance and the second eccentric distance are unequal.

15. The mobile terminal according to claim 13, wherein the substrate is made of a transparent conductive material and has a first surface and a second surface that are opposite to each other;

wherein the laser light source comprises an N-type confining layer, an active layer, a P-type confining layer, an anode electrode layer, and a cathode electrode layer;

wherein the N-type confining layer, the active layer, the P-type confining layer, and the anode electrode layer are stacked on the first surface from bottom to top respectively, and the cathode electrode layer is also disposed on the first surface; and wherein the lens array is disposed on one side of the second surface, and the light emitting surface of the lens array is opposite to the second surface.

16. The mobile terminal according to claim 13, wherein the substrate is made of a conductive material, and the substrate has a first surface and a second surface that are opposite to each other;

wherein the laser light source comprises an N-type confining layer, an active layer, a P-type confining layer, an anode electrode layer, and a cathode electrode layer;

wherein the N-type confining layer, the active layer, the P-type confining layer, and the anode electrode layer are stacked on the first surface from bottom to top respectively, and the cathode electrode layer is disposed on the second surface; and wherein the lens array is disposed on one side of the first surface, and the light emitting surface of the lens array is opposite to the first surface.

* * * * *